United States Patent
Hughes

(10) Patent No.: US 7,252,298 B2
(45) Date of Patent: Aug. 7, 2007

(54) PIVOT BEARING

(75) Inventor: Thomas Hughes, Cheshire (GB)

(73) Assignee: Meritor Heavy Vehicle Systems Limited, Wrexham (GB)

( * ) Notice: Subject to any disclaimer, the term of this patent is extended or adjusted under 35 U.S.C. 154(b) by 433 days.

(21) Appl. No.: 10/415,611

(22) PCT Filed: Aug. 31, 2001

(86) PCT No.: PCT/GB01/03908

§ 371 (c)(1),
(2), (4) Date: Apr. 30, 2003

(87) PCT Pub. No.: WO02/21012

PCT Pub. Date: Mar. 14, 2002

(65) Prior Publication Data

US 2004/0041362 A1   Mar. 4, 2004

(30) Foreign Application Priority Data

Sep. 5, 2000   (GB) .................................... 0021719

(51) Int. Cl.
*B60G 3/12* (2006.01)
(52) U.S. Cl. .................. 280/124.128; 267/141
(58) Field of Classification Search ................ 267/141, 267/141.1, 141.2, 257, 292; 280/124.128
See application file for complete search history.

(56) References Cited

U.S. PATENT DOCUMENTS 4,157,227 A * 6/1979 Hahle .......................... 403/228
5,190,269 A * 3/1993 Ikeda et al. ............. 267/140.12

FOREIGN PATENT DOCUMENTS

| DE | 36 35 612 | 5/1987 |
| WO | WO 95/23725 | 9/1995 |

\* cited by examiner

*Primary Examiner*—Faye M. Fleming
(74) *Attorney, Agent, or Firm*—Carlson, Gaskey & Olds

(57) ABSTRACT

A pivot bearing used in a vehicle trailing arm suspension includes a housing, a resilient bush compressed and bonded in the housing, and a rigid axial sleeve in the bush. The bush has voids, above and below the sleeve when the pivot bearing is fitted for use and stiffening elements which extend between the voids at opposite sides of the sleeve. When the pivot bearing is in use in a vehicle trailing arm suspension, the voids increase flexibility of the bush under generally vertical loading on the pivot bearing. The stiffening elements enhance the stiffness of the bush in generally horizontal direction for improved vehicle dynamics and reduced vibration. Preferably, the stiffening elements are of plate or leaf form, are bonded to the bush, and extend arcuately about the sleeve. The voids extend partially through the axial thickness of the bush from opposite ends of the bush and generally accurately about the sleeve. The bush also has enlarged opposite circumferential end portions. The end portions extend circumferentially beyond diametrically opposite parts of the external circumference of the sleeve and are in-turned towards the sleeve. Edges of the stiffening elements extend into the opposite end portions of the voids.

25 Claims, 2 Drawing Sheets

PIVOT BEARING

This application is the National Stage of International Application PCT/GB01/03908 filed Aug. 31, 2001.

BACKGROUND OF THE INVENTION

This invention relates to a pivot bearing, particularly, though not exclusively, for a vehicle trailing arm suspension.

Pivot bearings in a vehicle trailing arm suspension are subjected, in use, to forces in the vertical, horizontal, axial and torsional directions. It is desirable that the bearings be able to absorb these forces, including shock and out of phase wheel loading, and have a prolonged useful life.

Conventionally, pivot bearings for vehicle trailing arm suspension systems include a housing containing a generally cylindrical bush on a rigid axial sleeve in which a pivot of a trailing arm is located. Whilst being essentially stiff, the bush has some resilience intended to absorb vertical, horizontal and torsional forces, particularly roll induced forces and out of phase wheel loads. Usually, the bush is made of a rubber material. Bushes have been made solid and with the same level of stiffness/resilience all around the axial sleeve. This limits the effectiveness of the bush because the stiffness/resilience requirements at different angularly positioned parts of the bush around the pivot may vary appreciably in practice according to the direction in which loads are exerted on the bush in use. If the bush is heavily loaded in use, it will usually have a high level of stiffness which makes it too stiff for satisfactory absorption of loads. Alternatively, if the bush is made with a compromised level of stiffness/resilience for the range of loads exerted on it in use in different directions, its performance is clearly limited.

In order to vary the stiffness of the bush for different levels of forces acting on the pivot bearing from different directions in use, bushes have been made with voids, usually arcuate, above and below the axial sleeve. This softens the rate of the bush under general vertical loading whilst retaining greater stiffness in the generally longitudinal direction of the vehicle for compliance under roll and out of phase wheel loading. However, the stiffness provided in the generally longitudinal direction is limited and may be insufficient to cope satisfactorily with increasing loading conditions under which some vehicles are expected to operate.

According to a first aspect of the present inventions, a pivot bearing includes a housing which attaches the pivot bearing to a support means, a resilient generally cylindrical bush contained in the housing, and a rigid axial sleeve secured in the bush at which the pivot bearing is located for use. Voids are formed in first portions of the bush. When the pivot bearing is fitted for use, the voids are disposed above and below the axial sleeve. The pivot bearing includes stiffening elements made of material stiffer than that of the bush. The stiffening elements are contained in second portions of the bush and extend between the first portions at opposite sides of the axial sleeve.

The stiffening elements increase the stiffness of the bush in generally horizontal directions for improved vehicle dynamics and reduced vibration when the pivot bearing is in use.

The stiffening elements are rigid. They can be made of metal such as steel, or of a suitable plastics material. Preferably, the stiffening elements are securely retained, by bonding, to the bush. The stiffening elements can be of a plate or leaf form. The stiffening elements extend arcuately in the second portions about the sleeve. They can also take other forms. There can be a single stiffening element at each side of the sleeve, or there may be more than one stiffening element. Each stiffening element extends through the axial length of the bush and can project from the opposite ends of the bush.

Preferably, the bush is formed by molding. The voids are formed in the bush as it is molded. The stiffening elements are incorporated into the bush as it is molded, and the material of the bush is then bonded to the stiffening elements in the course of the molding process.

The voids extend arcuately, or generally arcuately, in the first portions of the bush about the sleeve. They can extend through the axial thickness of the bush, or partially through the thickness. The voids can extend into the bush from opposite end faces of the bush. In this latter arrangement similar, directly opposed, voids extend towards one another from the opposite end faces, but are separated by a central solid region of the bush.

Preferably, as viewed from each of the opposite ends of the bush, in the position of use of the pivot bearing, there is one elongated void above and one below the sleeve. Each void extends for a longer distance about the sleeve than the external diameter of the sleeve. Opposite ends of each void extend through and beyond notional parallel planes extending vertically tangentially of diametrically opposite parts of the external circumference of the sleeve. This increases the flexibility of the bush under generally vertical loading. Preferably, the ends of the voids are also enlarged, assisting in reducing stresses in the material of the bush at the ends of voids and facilitating compression of the bush under vertical loading. The annular width of the end regions of the voids can be increased and enlarged. In another form, the ends of the voids are enlarged by shaping them into two or more lobes, fingers or comparable projections running from the main bodies of the voids. At least one such projection at each end of a void extends inwardly towards the sleeve. In a preferred form, the ends of the voids are turned inwardly towards the sleeve to provide the enlargements. The ends of the voids can be turned inwardly at an angle, preferably substantially radially of the sleeve. Each end of the voids can also taper generally triangularly towards the sleeve.

The bush can have an interference fit in the housing. Alternatively, it can be bonded and/or molded into the housing.

In a preferred embodiment, the bush is formed, as by molding, separately from the housing and is then compressed into and bonded in the housing. The bush is fixed on the sleeve before insertion into the housing. The voids of the uncompressed bush are open so that the opposite longitudinal sides of the elongated voids extending above and below the sleeve are spaced apart. The ends of the voids are turned inwardly towards the sleeve in the manner described above and taper generally triangularly towards the sleeve. Upon insertion of the bush into the housing, and its radial compression thereby, the compression of the first portions containing the voids causes the opposite longitudinal sides of the voids to close together. In the assembled pivot bearing, therefore, the voids are substantially closed; only the inturned ends of the voids may remain open, through to a lesser extent than in the uncompressed state of the bush. Although the voids are closed, the first portions remain relatively compressible, thereby affording substantial compliance in the bush under loading in the vertical, and generally vertical, directions.

By contrast, the compression of the bush at the second portions resulting from its insertion into the housing, in combination with the stiffening afforded by the stiffening elements, leaves the second portions substantially stiffened against further compression under horizontal, and generally horizontal, loading on the bush when it is in use.

The stiffening elements, at least in the plate or leaf form, extend into opposite ends of the voids. When the ends of the voids are enlarged into lobes, fingers or comparable projections, as described, the stiffening elements preferably extend into the voids between adjacent projections. In the preferred form of the voids having the inwardly turned ends, the material of the bush is radiused into the ends of the voids at the stiffening elements where the stiffening elements break into the voids. These arrangements reinforce the bush where stresses are concentrated under vertical, and generally vertical, loading and help to prevent separation of the material of the bush from the stiffening elements adjacent the voids.

The bush can be bonded to the sleeve. When the bush is molded, it can be bonded onto the sleeve as it is molded. The sleeve can protrude from the opposite ends faces of the bush.

In one example, the sleeve is axially longer than the housing for compliance of the bush under axial and tilting loading. The sleeve projects symmetrically from the opposite axial ends of the housing. Preferably, the bush is shaped to correspond substantially in axial length to the length of the sleeve at its internal diameter and to have its ends inclined away from the sleeve so that the axial length of the bush reduces towards its external diameter. This allows for tilting of the bush relative to the sleeve and bulging of the ends under loading.

In one embodiment, a pivot bearing is made to be used in a vehicle trailing arm and its attachment to a supporting part of the vehicle. The pivot bearing is designed to withstand horizontal, vertical, axial and torsional loading when in use. The housing of the pivot bearing is cylindrical and co-axial with the sleeve. The bush is bonded onto the rigid axial sleeve and securely retained in the housing. Both the sleeve and housing are made of metal, for example steel. The bush has a cylindrical body with frusto-conical, or convex, end faces. The sleeve is longer than the housing and projects from the end faces of the body. The body is made of a rubber, polyurethane, or comparable, flexible material. Generally arcuately extending elongated voids are formed in first portions of the body. When the pivot bearing is fitted for use, the voids are above and below the sleeve, the voids opening through the end faces of the body. The voids are longer arcuately than the external diameter of the sleeve and have inwardly turned end portions which taper triangularly, generally radially, towards the sleeve. Stiffening elements extend through the second portions of the body adjacent diametrically opposed sides of the sleeve. There is one stiffening element at each side of the sleeve. The stiffening elements are made of metal, for example steel, and are of a plate or leaf form arcuately curved concentrically about the sleeve. The stiffening elements are shorter than the sleeve, extend through the full axial length of the body, and protrude from the opposite end faces of the body. Each stiffening element projects into the adjacent end portions of the voids.

The housing is fixed to the trailing arm for use of the pivot bearing such that the central longitudinal axis of the sleeve extends horizontally transversely of the arm. A pivot pin is located in the sleeve and is supported by opposed limbs of a mounting which straddles the pivot bearing and is fixed to the supporting part of the vehicle. The protruding ends of the sleeve abut, or bear on, thrust washers which abut opposed, inner surfaces of the respective limbs of the mounting. In use of the suspension system, generally vertical and horizontal loadings imposed on the pivot bearing by relative movement between the pivot pin and trailing arm are accommodated respectively by the voided first portions of the bush and the second portions stiffened by the stiffening elements. The body of the bush is able to sustain axial, torsional and tilting loading on the bush.

The pivot bearing can be included as original equipment on a trailing arm of a vehicle trailing arm suspension system.

Thus, according to a second aspect of the present invention, there is provided vehicle trailing arm including a pivot bearing in accordance with the first aspect of the invention herein set forth, the housing of the pivot bearing begin fixed with respect to the trailing arm.

According to a third aspect of the present invention, there is provided a vehicle trailing arm suspension system including at least one trailing arm in accordance with the foregoing second aspect of the invention.

BRIEF DESCRIPTION OF THE DRAWINGS

An embodiment of the invention will now be described by way of example only with reference to the accompanying drawings, in which.

DETAILED DESCRIPTION OF THE PREFERRED EMBODIMENT

The pivot bearing in this embodiment of the present invention is to be used in a vehicle trailing arm suspension system.

Figure 3:
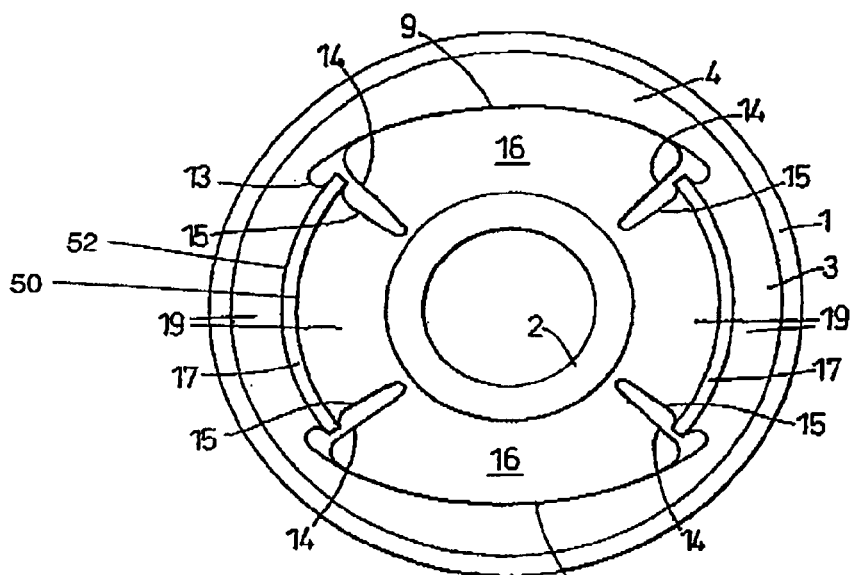
FIG. 3 is an end view of the pivot bearing including the bush of FIGS. 1 and 2, FIGS. 4 and 5 are end views of the bush showing modifications.

Referring to FIG. 3, the pivot bearing comprises a housing 1, an axial sleeve 2 and a bush 3.

The housing 1 is cylindrical and made of circular section steel tube. The sleeve 2 is also made of a circular section steel tube and is longer than the housing 1.

Figure 1:
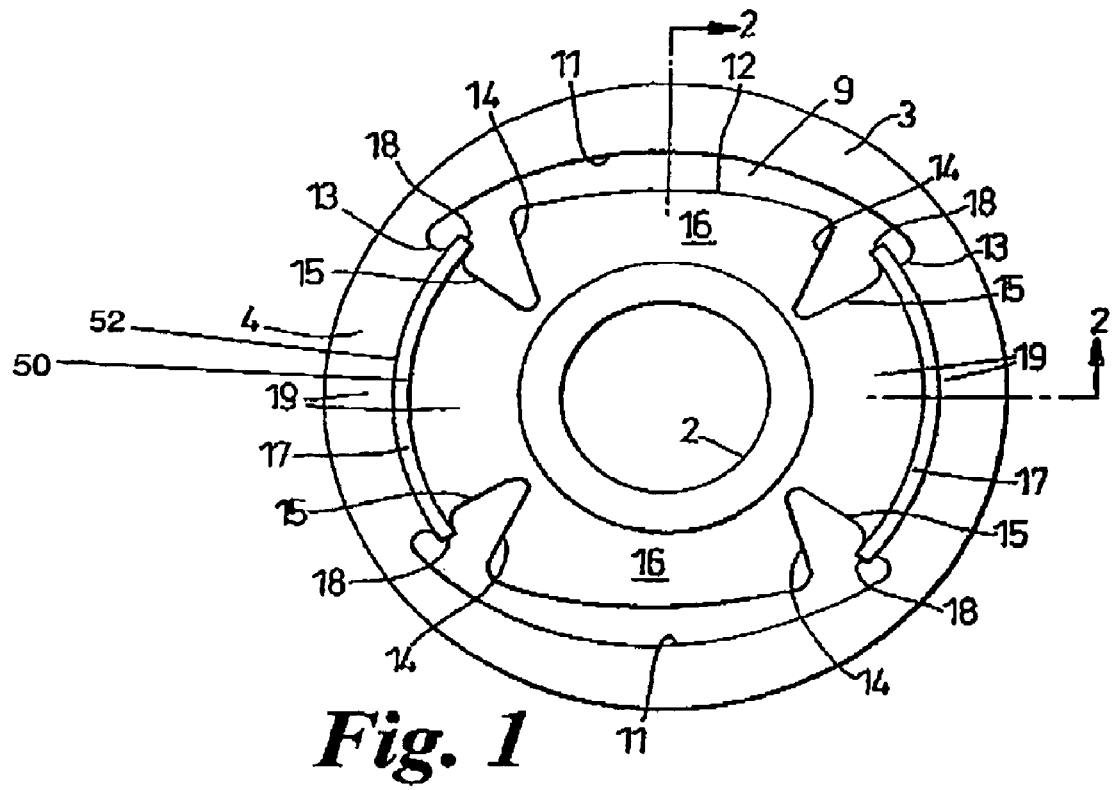
FIG. 1 is an end view of a bush of a pivot bearing in accordance with the present invention.
Figure 2:
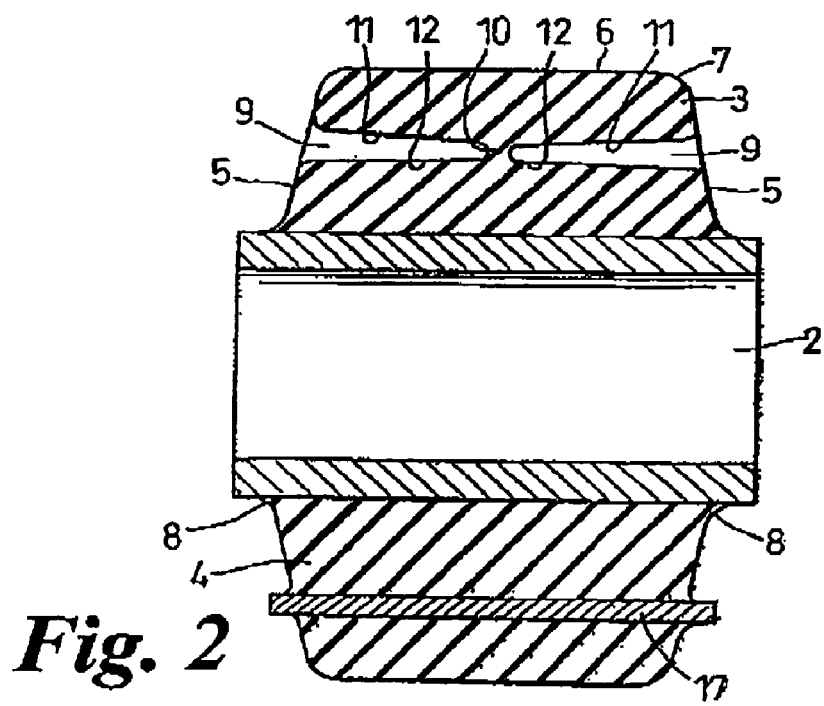
FIG. 2 is an axial section through the bush on line 2—2 of FIG. 1.

The bush 3, as best seen in FIGS. 1, 2 and 3, includes a cylindrical body 4 of a rubber material having a substantial degree of stiffness, but some resilience. The body 4 is concentrically molded onto, and bonded to, the sleeve 2. The body 4 has an external diameter such that it has to be radially compressed to fit into the housing 1 and a length that is fully received at its outer cylindrical surface into the housing 1. Opposite end faces 5 are shallowly frusto-conical. The end faces 5 merge into the external cylindrical surface 6 of the body 4 at convexly radiused edges 7 and meet the external surface of the sleeve 2 at concave radii 8. The sleeve 2 projects symmetrically from the opposite end faces 5 of the body 4.

Two similar voids extend into the body 4 from each of the opposite end faces 5. The voids 9 are formed in the body 4 as it is molded, and are in diametrically opposed segments of the body 4. When the pivot bearing is fitted for use, the voids 9 are respectively above and below the sleeve 2. The voids 9 at one end face 5 are axially directly opposite those of the other end face 5. The voids 9 extend almost to, but are separated by, a solid web 10 of the material of the body 4 at the center of the length of the body 4. The voids 9 taper gradually towards their closed axially inner ends.

FIG. 3 illustrates the free state of the body 4 as molded, before the bush 3 is inserted into the housing 1. Each void 9, as viewed at the end faces 5 of the body 4, is elongated, and has an arcuate outer side wall 11 curved about, but having a radius of curvature greater than its distance from, the central longitudinal axis of the body 4. An inner side wall 12 of a larger radius of curvature extends substantially as a chord of the arc of the outer side wall 11. The void 9 is of substantially greater length than the external diameter of the sleeve 2. As shown in FIG. 1, the opposite end portions 13 of the voids 9 are enlarged by being turned generally radially inwardly in a similar manner. Each end portion 13 is of a substantially isosceles triangle shape elongated towards the sleeve 2, one side 14 extending from the inner side wall 12 of the void 9 and the opposite side 15 extending from the outer side wall 11 of the void 9 and being directed generally towards the central longitudinal axis of the body 4. The portion of the body 4 between each void 9 and the sleeve 2 forms a buffer 16 of the bush 3.

Two similar rigid metal stiffening elements 17 are set in the body 4 of the bush 3 as the bush 3 is molded. The stiffening elements 17 can also be made of a sal table plastic material. The stiffening elements 17 are securely bonded to the material of the body 4. As shown in FIG. 1, the stiffening elements 17 are partially embedded in the bush 3 such that a radially inside surface 50 and a radially outside surface 52 of each of the stiffening elements 17 are both bonded to the bush 3. They are in two diametrically opposed segments of the body 4 that are between the two segments that contain the voids 9. Each stiffening element 17 is in the form of a generally rectangular leaf which is bowed co-axially about the central longitudinal axis of the body 4. The two stiffening elements 17 are similarly radially spaced from the sleeve 2. As shown in FIG. 2, the stiffening elements 17 extend through the full axial length of the body 4 and protrude from the end faces 5 of the body 4, but do not extend as far as the ends of the sleeve 2. Opposite side edges 18 of the stiffening elements 17, at the extremities of the bows of the stiffening elements 17, extend through the sides 15 of the adjacent end portions 13 of the voids 9, substantially opposite the inner side walls 12, and project into the voids 9. The sides 15 are concavely radiused to merge with the side edges 18 of the stiffening elements 17 to enhance resistance to separation of the material of the bush 3 from the extremities of the bows of the stiffening elements 17. The portions of the segments of the body 4 radially inside and outside of the stiffening elements 17 form shear blocks 19 of the bush 3.

As stated, the body 4 is radially compressed to fit into the housing 1. The compression of the body 4 results in the outer and inner side walls 11, 12 of the voids 9 being urged together so that the voids 4 are effectively closed between those walls 11,12, as shown in FIG. 3. The opposed sides 14, 15 of the end portions 13 of the voids 9 are also urged towards one another, narrowing, but not closing, the end portions 13.

The stiffening elements 17 substantially increase the stiffness of the body 4 of the bush 3 in horizontal, and generally horizontal, directions, i.e. at the shear blocks 19, for fore and aft loading on the bush 3 when the pivot bearing is in use. The stiffening elements 17 considerably reduce the extent of the deflection of the body 4 under such loading. It has been found that the extent of the deflection may be reduced to up to as much as half that which may be experienced in a bush 3 without the stiffening elements 17, but otherwise similar. The increased stiffness, which increases non-linearly with increasing loading, is particularly advantageous when the pivot bearing is used in a trailing arm suspension for a trailer vehicle because of the improved stability it provides for the vehicle when carrying high loads with a high center of gravity. The stiffness also reduces self-induced steering effects in the pivot bearing, reduces tire wear in the vehicle, and generally helps to enhance the durability of the vehicle's running gear in use.

The voids 9 in the body 4, though closed when the bush 3 is compressed into the housing, affords appreciable resilience in the segments of the body 4 in which they are formed, including the buffers 16, thereby giving the bush 3 substantial resilience under the loading in vertical, and generally vertical, directions.

Resilience in the body 4 allows relative axial and tilting movement between the bush 3 and sleeve 2 under loading in the generally axial direction of the pivot bearing.

During use, roll and out of phase wheel loading maneuvers of the vehicle are applied to the pivot bearing. The compliance to these maneuvers is improved by the differing degrees of deflection provided for in the bush 3.

Figure 4:
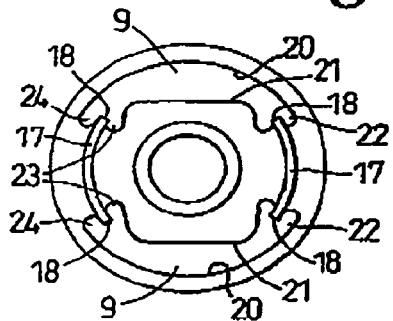
Figure 5:
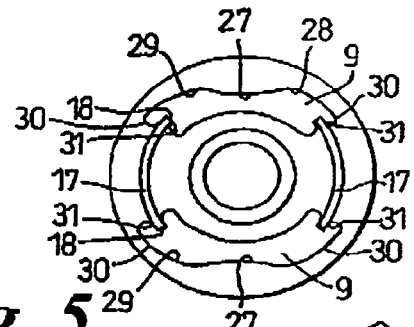

Two alternate forms of the voids 9 in the body 4 of the bush 3 are shown in FIGS. 4 and 5 of the drawings.

Referring to FIG. 4, each void 9 is elongated, and has an arcuate outer side wall 20 curved about the central longitudinal axis of the body 4 and a substantially straight inner side wall 21 extending along a chord of the arc of the outer side wall 20. Under generally vertical loading on the body 4, the outer and inner side walls 20, 21 are urged towards one another, and during increased loading the inner side wall 21 assumes a curvature which increases towards that of the outer side wall 20. The void 9 has a length substantially greater than the external diameter of the sleeve 2. The opposite end portions 22 of the void 9 are enlarged in a similar manner, and each end portion 22 is shaped into two divergent lobes 23, 24. The inner lobe 23 is directed generally toward the central longitudinal axis of the body 4. A cuspidated land 25 separates the two lobes 23, 24.

In this example, the opposite side edges 18 of the stiffening elements 17 extend through the lands 25 at the adjacent enlarged end portions 22 of the voids 9 and project into the voids 9. This arrangement resists separation of the material of the bush from the extremities of the bows of the stiffening elements 17.

Referring now to FIG. 5, the voids 9 are elongated to a similar extent as before, but an inner side wall 26 of each void 9 is arcuately curved co-axially about the sleeve 2 and a central portion 27 of an outer side wall 28 of each void 9 is oppositely and inwardly curved with a similar radius of curvature. Thus, the two side walls 26, 28 are convergent at the central part of the void 9. At either side of the inwardly curved central portion 27, the curvature of the outer side wall 28 reverses so that the end portions 29 of the outer side wall 28 curve co-axially about the sleeve 2 and parallel to the inner side wall 26. There is a smooth radiused transition between the central 27 and end portions 29 of the outer side wall 28. The change of curvature of the outer side wall 28 results in opposite end portions 30 of the void 9 being enlarged. A substantial part of the enlargement of the end portions 30 is beyond the horizontally diametrically opposed sides of the external circumference of the sleeve 2. Each end wall 31 of each void 9 is cuspidated on the central longitudinal axis of the void 9.

The opposite side edges 18 of the stiffening elements 17 project into the voids 9 at the centers of their cuspidated end walls 31.

Figure 6:
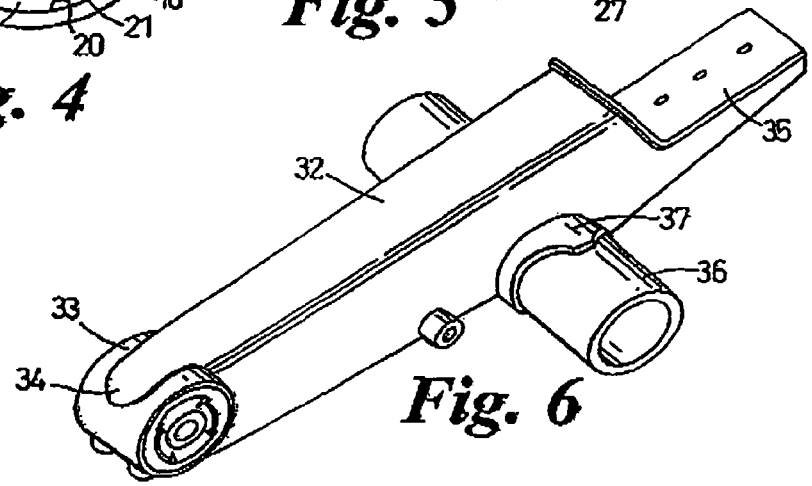
FIG. 6 is a perspective view of a trailing arm suspension system including the pivot bearing of FIG. 3.

FIG. 6 of the drawings illustrates a trailing arm 32 of a vehicle trailing arm suspension system in which the pivot bearing described with references to FIGS. 1 to 3 is included. This system is suitable for use in a heavy trailer vehicle. The arm 32 is fabricated from metal plate. The pivot bearing, indicated at 33, is secured transversely in one bifurcated end 34 of the arm 32. At its opposite end, the arm 32 is provided with a seat 35 for an air spring (not shown). An axle 36 is attached to an intermediate part of the length of the arm 32 by a wrapper 37.

A pivot pin is located in the sleeve and is supported by opposed limbs of a mounting which straddles the pivot bearing and is fixed to the supporting part of the vehicle. The protruding ends of the sleeve abut, or bear on, thrust washers which abut opposed, inner surfaces of the respective limbs of the mounting. In use of the suspension system, generally vertical and horizontal loadings imposed on the pivot bearing by relative movement between the pivot pin and trailing arm are accommodated respectively by the voided first portions of the bush and the second portions stiffened by the stiffening elements. The body of the bush is able to sustain axial, torsional and tilting loading on the bush.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A pivot bearing comprising:
   the pivot bearing being attachable to a support member by a housing;
   a resilient substantially cylindrical bush of a first material said housing, said resilient substantially cylindrical bush having opposing ends and including first portions having voids and second portions, wherein said voids each comprise two similar, directly opposed void portions which extend towards one another from said opposing ends and are separated by a solid web, wherein said solid web is made of the first material of said resilient substantially cylindrical bush;
   a rigid axial sleeve having opposing sides secured in said resilient substantially cylindrical bush, and said voids are disposed above and below said rigid axial sleeve when the pivot bearing is fitted for use; and
   stiffening elements formed of a second material stiffer than said first material, wherein said stiffening elements each include a radially inward surface bonded to said resilient substantially cylindrical bush and said stiffening elements are in said second portions of said resilient substantially cylindrical bush and extend between said first portions at said opposing sides of said rigid axial sleeve.

2. The pivot bearing according to claim 1, wherein said second material is one of a metal and a plastic.

3. The pivot bearing according to claim 1, wherein said stiffening elements extend arcuately in said second portions about said rigid axial sleeve.

4. The pivot bearing according to claim 1, wherein said stiffening elements project from said opposing ends of said resilient substantially cylindrical bush.

5. The pivot bearing according to claim 1, wherein said resilient substantially cylindrical bush is molded, and said voids are formed in said resilient substantially cylindrical bush during molding.

6. The pivot bearing according to claim 1, wherein said voids extend at least generally arcuately in said first portions of said resilient substantially cylindrical bush about said rigid axial sleeve.

7. The pivot bearing according to claim 1, wherein said resilient substantially cylindrical bush has an axial thickness, wherein said voids extend partially through said axial thickness.

8. The pivot bearing according to claim 1, wherein said resilient substantially cylindrical bush is bonded to said rigid axial sleeve.

9. The pivot bearing according to claim 1, wherein said rigid axial sleeve protrudes from said opposing ends of said resilient substantially cylindrical bush.

10. The pivot bearing according to claim 1, wherein said resilient substantially cylindrical bush has an interference fit in said housing.

11. The pivot bearing according to claim 1, wherein said resilient substantially cylindrical bush is compressed into, and bonded in, said housing, and said voids of said resilient substantially cylindrical bush are substantially closed when said resilient substantially cylindrical bush is received in said housing.

12. The pivot bearing as recited in claim 1, wherein said second portions comprise two second portions and said first portions comprise two first portions, wherein each of said second portions is located on one of said opposing sides of said rigid axial sleeve and each of said second portions is located between said two first portions.

13. The pivot bearing as recited in claim 1 wherein said stiffening elements each include a radially outward surface opposite to said radially inward surface that is bonded to said resilient substantially cylindrical bush, and said stiffening elements are each partially embedded in said resilient substantially cylindrical bush.

14. The pivot bearing according to claim 1, wherein said solid web is located at a center of a length of said resilient substantially cylindrical bush.

15. The pivot bearing according to claim 1, wherein each of said two similar, directly opposed void portions taper towards one another.

16. The pivot bearing according to claim 1, wherein said first material of said resilient substantially cylindrical bush extends between said voids and said housing and between said voids and said rigid axial sleeve.

17. the pivot bearing according to claim 1, wherein an entire outer circumference of said resilient substantially cylindrical bush contacts said housing.

18. The pivot bearing according to claim 1, wherein an entire inner circumference of said resilient substantially cylindrical bush contacts said rigid axial sleeve.

19. A pivot bearing comprising:
   the pivot bearing being attachable to a support member by a housing;
   a resilient substantially cylindrical bush of a first material in said housing, said resilient substantially cylindrical bush having opposing ends and including a first portions having voids and second portions, wherein said voids each comprise two similar, directly opposed void portions which extend towards one another from said opposing ends and are separated by a solid web, wherein said solid web is made of the first material of said resilient substantially cylindrical bush;
   a rigid axial sleeve having opposing sides secured in said resilient substantially cylindrical bush, and said voids of said resilient substantially cylindrical bush are disposed above and below said rigid axial sleeve when the pivot bearing is fitted for use, wheein one of said voids is above said rigid axial sleeve and another of said voids is below said rigid axial sleeve, and said ridid axial sleeve has an external diameter and an external circumference, and each of said voids are elongated with respect to said external circumference of saod rigid axial sleeve and extend for a distance about said rigid axial sleeve that is longer than said external diameter of said rigid axial sleeve; and a stiffening element formed of a second material stiffer than said first material, wherein said stiffening elements are in said second portions of said resilient substantially cylindrical bush and extend between said first portions at said opposing sides of said rigid axial sleeve.

20. The pivot bearing according to claim 19, wherein each of said voids has opposing enlarged circumferential ends, whereby stresses in said resilient substantially cylindrical bush at said opposing enlarged circumferential ends of said voids are reduced and compression of said resilient substantially cylindrical bush under vertical loading on the pivot bearing during use is facilitated.

21. The pivot bearing according to claim 20, wherein said voids each include a main body, and said opposing enlarged circumferential ends of said voids are enlarged into a plurality of projections extending from said main body of each of said voids.

22. The pivot bearing according to claim 21, wherein said opposing enlarged circumferential ends of said voids include adjacent projections, and each of said stiffening elements extends into one of said opposing enlarged circumferential ends of each of said voids and between said adjacent projections of said opposing enlarged circumferential ends.

23. The pivot bearing according to claim 20, wherein said opposing enlarged circumferential ends of said voids each taper generally triangularly towards said rigid axial sleeve.

24. The pivot bearing according to claim 19, wheein each of said voids has opposing circumferential ends, and each of said stiffening elecents extends into one of said opposing circumferential ends of each of said voids.

25. A pivot bearing comprising:

the pivot bearing being attachable to a support member by a housing;

a resilient substantially cylindrical bush of a first material in said housing, said resilient substantially cylindrical bush having opposing ends and including first portions having voids and second portions, wherein said voids each comprise two similar, directly opposed void portions which extend towards one another from said opposing ends and are separated by a solid web, wherein said solid web is made of said first material of said resilient substantially cylindrical bush;

a rigid axial sleeve having opposing sides secured in said resilient substantially cylindrical bush, and said voids of said resilient substantially cylindrical bush are disposed above and below said rigid axial sleeve when the pivot bearing is fitted for use; and a stiffening elements formed of a second material stiffer than said first material, wherein said stiffening element includes a radially inward surface bonded to said resilient substantially cylindrical bush, and said stiffening element is in one said second portions of said resilient substantially cylindrical bush and extends between said first portions at said opposing sides of said rigid axial sleeve.

* * * * *

UNITED STATES PATENT AND TRADEMARK OFFICE
CERTIFICATE OF CORRECTION

PATENT NO. : 7,252,298 B2
APPLICATION NO. : 10/415611
DATED : August 7, 2007
INVENTOR(S) : Thomas Hughes It is certified that error appears in the above-identified patent and that said Letters Patent is hereby corrected as shown below:

Column 7, line 35: insert --in-- after "material"

Column 8, line 57: delete "a"

Column 9, line 1: "wheein" should read as --wherein--

Column 9, line 3: "ridid" should read as --rigid--

Column 9, line 6: "saod" should read as --said--

Column 9, line 10: delete "a"

Column 9, line 10: "element" should read as --elements--

Column 10, line 1: "wheein" should read as --wherein--

Column 10, line 10: "elecents" should read as --elements--

Column 10, line 25: "elements" should read as --element--

Signed and Sealed this

Sixth Day of November, 2007

JON W. DUDAS
*Director of the United States Patent and Trademark Office*